United States Patent [19]
Jung

[11] Patent Number: 5,918,396
[45] Date of Patent: Jul. 6, 1999

[54] LIGHT BOX WITH EDGE-LIT PANEL

[76] Inventor: Hae-Ryong Jung, 2111 Jefferson Davis Hwy. #119-N, Arlington, Va. 22202

[21] Appl. No.: 08/799,351

[22] Filed: Feb. 14, 1997

Related U.S. Application Data

[60] Provisional application No. 60/011,789, Feb. 16, 1996.

[51] Int. Cl.$^6$ ........................................................ G09F 13/18
[52] U.S. Cl. .................................................. 40/546; 40/564
[58] Field of Search .................................... 40/546, 564

[56] References Cited

U.S. PATENT DOCUMENTS 3,076,278  2/1963  Zack .......................................... 40/546

FOREIGN PATENT DOCUMENTS

| | | | |
|---|---|---|---|
| 817194 | 8/1937 | France ........................................... | 40/546 |
| 418975 | 8/1923 | Germany ........................................ | 40/546 |

*Primary Examiner*—Cassandra H. Davis

[57] ABSTRACT

An improved illuminated sign comprising a thermoformed plastic housing having at least one linear semicircular inner surface lined by highly reflective plastic sheet material and clear plastic sheet having a bit smaller dimension of cut off opening area whereby a sign face is covered to pass light energy emitted from light source positionally enclosed in the plastic housing. The clear plastic panel is extended to form any geometric or irregular free edge line which cut face is bevelled to create a geometric or an irregular illuminated edge line that can be observed as a boarder line surrounding the sign graphics from the observers from the front side of the sign. An extended length of the clear plastic panel may be used as a wet erasable writing surface by using water base fluorescent markers which is useful to show a strong sign together with hand written messages or graphics surrounded by a illuminated boarder line on one fixture.

3 Claims, 5 Drawing Sheets

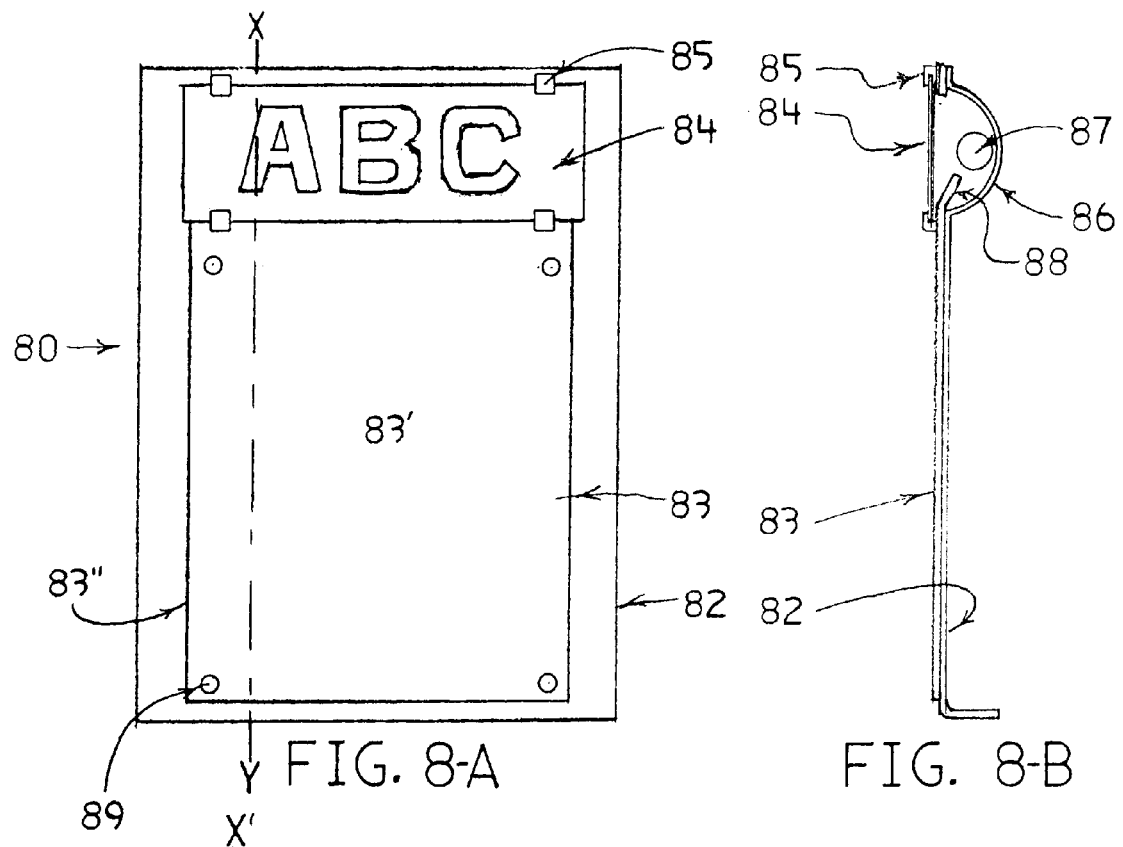
FIG. 8-A · FIG. 8-B
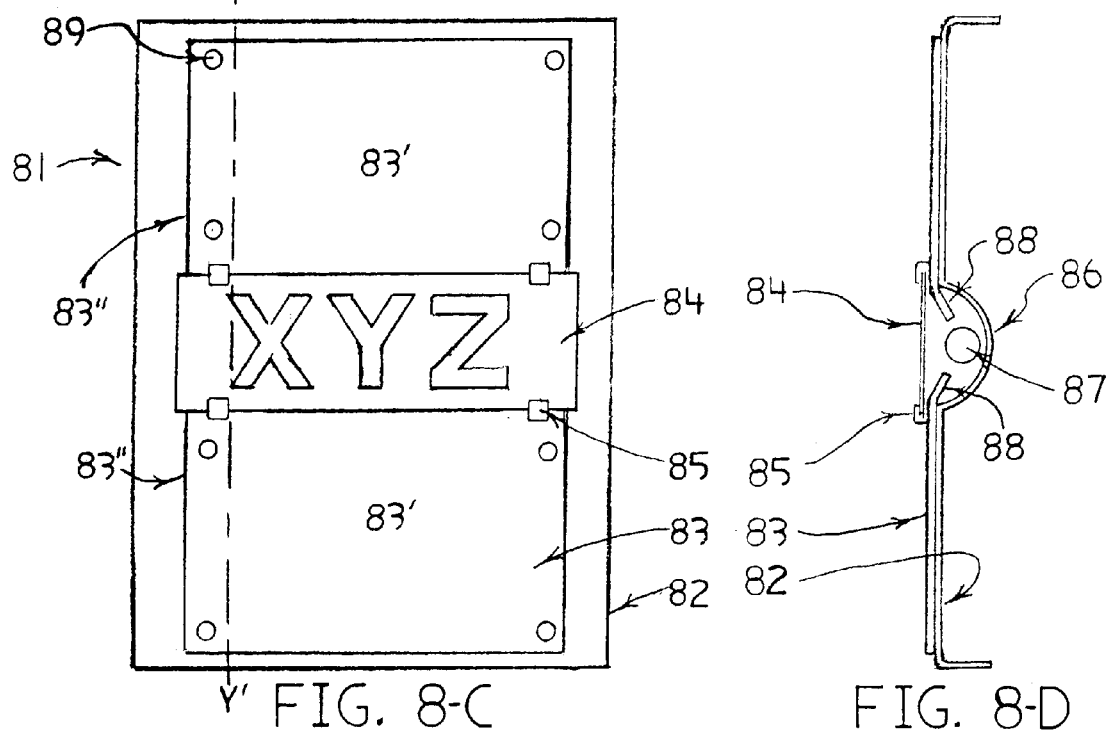
FIG. 8-C · FIG. 8-D

LIGHT BOX WITH EDGE-LIT PANEL

This invention is a continuation of the provisional application Ser. No. 60/011,789 filed on Feb. 16, 1996.

BACKGROUND OF THE INVENTION

1) Field of the Invention

The present invention relates to a plastic housing and frame of back-lit illuminated signs which are produced by vacuum forming or thermo-press forming technology by using thermoformable polymeric plastic sheet material, and transparent or translucent plastic panels.

2) Description of the Prior Arts

The U.S. Pat. No. 5,509,223 Lighting System discloses that a highly reflective linear semi-circular reflector combined with tubular light source to create a consecutive and overlapped virtual images of the light source which provides a strong band of back lighting for an illuminated signs, and it's basic principles are applied to this invention as a part.

The Basics of edge illuminating mechanisms are also applied to the present invention to create a improved visual effect for an improved illuminated sign providing more variations in applications.

The housing of small size illuminated signs are normally made of various thermoformable polymeric plastic sheet such as ABS, styrene, poly-propylene, and it's color is normally very dark such as black or dark gray etc. to minimize it's visibility for the observers of the illuminated sign which is a basic requirement of the outer surface of the housing to enhance the illuminated graphics. But, a requirement of inner surface of the box is totally opposite to the requirement of the outer surface which should be the brightest possible to reflect the light energy emitted from light sources in maximum to make the illuminated sign face the brightest possible. To make a better inner surface of the housing, white paint have been coated on the inner surface of the housing to improve the reflectivity when a black or dark color sheet material is used.

To eliminate the cumbersome paint coating procedure, two sided thermoformable polymeric plastic sheet having a white and black on each faces is produced by using co-extrusion technology which can easily produce the housing with dark outer surface with white inner surface at one step of thermoforming.

In further, there are many different kind of combination of laminated termoformable sheet with highly reflective surface have been introduced, and it is commercially available in the market. But these sheet stocks are not enough to be competitive in the price and there is many technical difficulties in the process of a good thermoforming.

To produce an illuminated sign, a device to hold a sign face is essential, and sometimes a replacing mechanism of the sign face is also a requirement of which function is normally provided on frames which is holding the flange of housing and the sign face at one time, and there are many different designs to maximize the function of holding and replacing mechanism of the sign face in good shape of looking.

SUMMARY OF THE INVENTION

It is an object of the present invention to provide an improvement of a brightest back-lit illuminated sign disclosed in the U.S. Pat. No. 5,509,223, Lighting System by adding several more features.

It is another object of the present invention to provide the most inexpensively produced highly reflective vacuumformable polymeric plastic sheet having one face in black color to form a housing of the sign described in present invention.

It is still another object of the present invention to provide an illuminated sign without conventional frames that is fastening the housing and sign face, and an extended clear plastic panel with certain cut out area provided for easy access of replacement of the light source from the front side, and the cut out face may be an entrance of light energy to create dispersion effect of the light energy at the rear surface of the clear panel as well as at the edge of free end of the clear panel which creates an elegant look illuminated fringe line surrounding the major graphics on the sign face.

BRIEF DESCRIPTION OF THE DRAWINGS

FIG. 8-A and FIG. 8-C are showing a front view of an application as an illuminated wet erasable writing board, and FIG. 8-B and FIG. 8-D are showing it's cross sectional view along the cut plane X–Y and X'–Y' respectively.

DETAILED DESCRIPTION OF THE INVENTION

Figure 1:
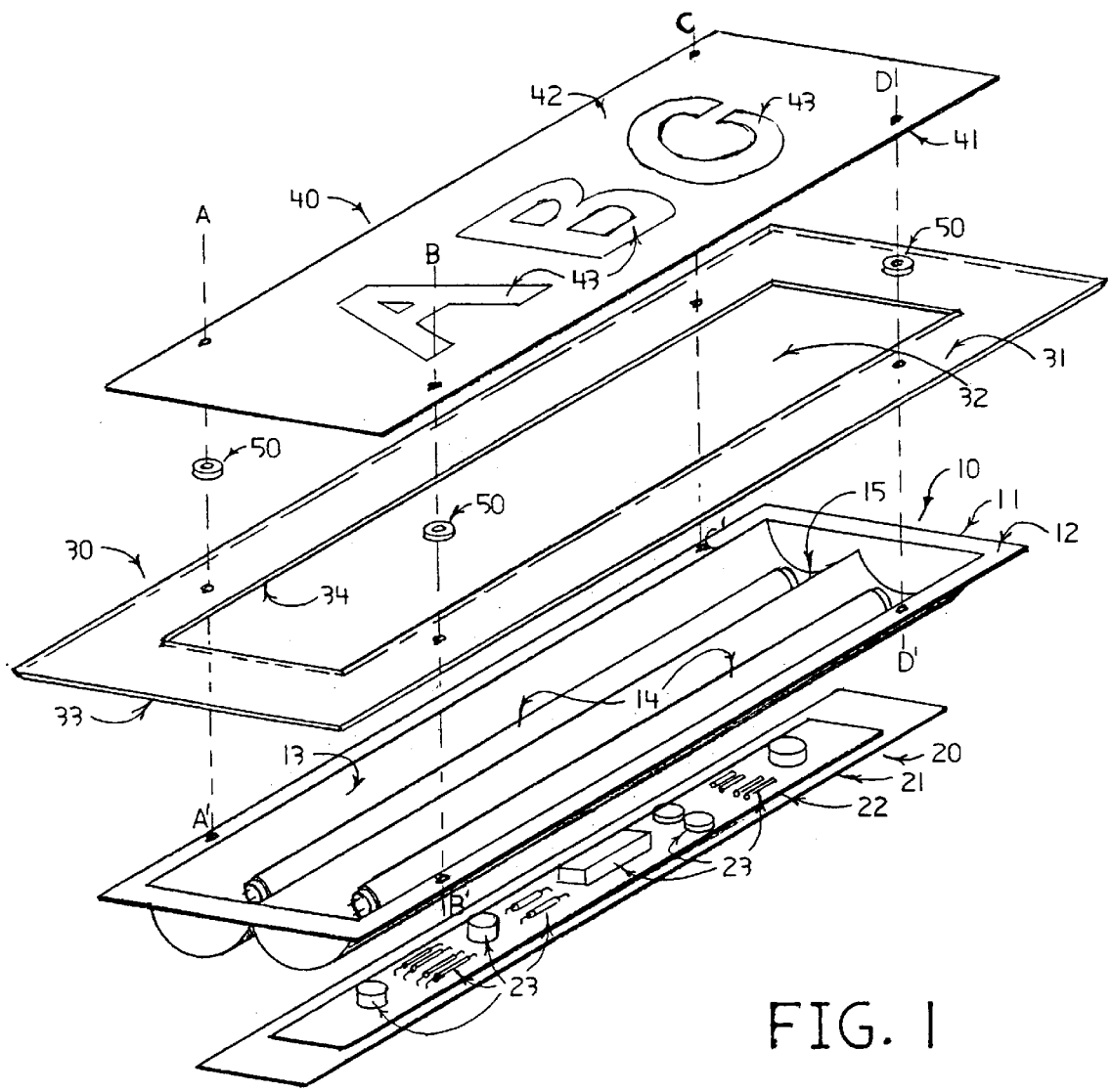
FIG. 1 is a isometric perspective view of disassembled parts and components of illuminated sign.

The invention will now be described with reference to the drawings. As shown in FIG. 1, four (4) disassembled major parts are shown in the figure.

The sign face (40) is comprised of a clear or translucent plastic panel (41) and a certain art work provided on the front surface (42) or back surface which is an opposite side surface of the sign panel (41). In many case, vinyl sheet with adhesives on one face is applied to create a desired graphics, and it is the most popular material used in sign industry. Said vinyl sheet is partially cut out to provide openings (43) to pass the light energy emitted by the lighting means positionally stowed in the housing (10). Silk screen printing technology is also applied to create many number of identical graphics. When a brighter reflection is desired, a reflective vinyl film may be applied from the back surface of the sign panel (41) having a mirror image graphics, to bounce back all the light energy arrived to the surface of reflective film. The material of the sign face panel (41) may be a transparent for direct pass of the light or transluscent material a creation of light diffusion effect on the panel.

The clear plastic panel (30) is cut in rectangular shape with rectangular opening (32) hollow area, and it is a kind of flat and wide clear plastic panel acting as a frame of conventional illuminated signs. This opening area is to induce the light energy emitted by the light source (14) in to the clear plastic panel through the edge face (34), and also this opening may be used for a front access of replacement of light source. Outer cut off face (33) is not a square cutting but a non-finished bevel cutting toward the housing (10) to create a light dispersion effect on the rough surface along the edge line of said clear plastic panel (31) so that observers from the front side of the sign can observe a certain width of illuminated boarder line along the free edge (33). Inner cut off face (34) is also a bevel cutting toward the light source (14) to receive a maximum amount of light energy emitted from the light source (14). The angle of bevelling may be designed depending on requirements, but the most popular bevelling bits readily available in the market are 45 degrees and 60 degrees bits. The way of bevelling is rather clearly shown in the cross sectional view shown in FIG. 5 and FIG. 6. The light energy went into the clear plastic panel frame (31) through said bevel cut edge line (34) will start traveling through the panel by consecutive total reflections occurred on both panel surface which normally called a light piping, and it will arrive up to the end of panel and hit said not finished rough beveled edge surface (33) whereon the light energy will be dispersed, and this will produce the desired effect of illuminated fringe lines surrounding the strongly illuminated major graphics in the middle area of the sign.

Lighting fixture housing (10) has a flange (11) surrounding the whole housing and it will fit on to the back face of said clear plastic panel member (31), and one or plurality of semicircular back face with highly reflective inside wall (13) are provided for strong reflection of the light energy emitted by said tubular light source (14). The light source may be a fluorescent lamp or cold cathode lamp or even a neon tube, and the ratio of diameter of the tubular light source and the diameter of the circular back face is described in the U.S. Pat. No. 5,509,223 Lighting System when a strong illuminated band is required to create a maximum brightness of the sign face to be observed through said opening (43). Said highly reflective or specular surface (13) may be created by lining of silver or aluminum deposited specular film or the like on the semicircular inner surface. If this method is applied, a sharp breaking line (15) can be easily formed to exclude any dark lines appeared on said breaking line (15) which is very difficult to form a sharp breaking line by using any of other plastic thermoforming technology.

The tubular light source is normally a vacuum discharge lighting system, and generally it require a current stabilization circuit to stabilize electric current after the lighting is triggered which is normally called as a ballast. A ballast circuit is a basic requirement for all of tubular lighting systems no matter what kind of vacuum discharge lighting system is adopted. Back cover (20) is comprised of cover plate (21) and printed circuit board (PCB) and electronic components (23) to form a ballast circuit as a part of lighting fixture, and it will close and fit on to the valley area formed between two or more concave semicircular back face of housing (10). Conventional magnetic ballast circuit normally consist of a heavy choke coil with a certain reactance and it normally generate a considerable amount of heat which require a special care in design for a reasonable dissipation of heat and mechanical strength to support the weight. But, since electronic ballast circuit has become very popular in the lighting industry, these drawbacks are almost eliminated including humming problem by boosting the frequency of the current in the range of 30,000–50,000 Hz. When the components (23) are spread in longitudinal direction by using long PCB as shown in the figure, it can be easily stowed in the back area of housing (10).

Figure 2:
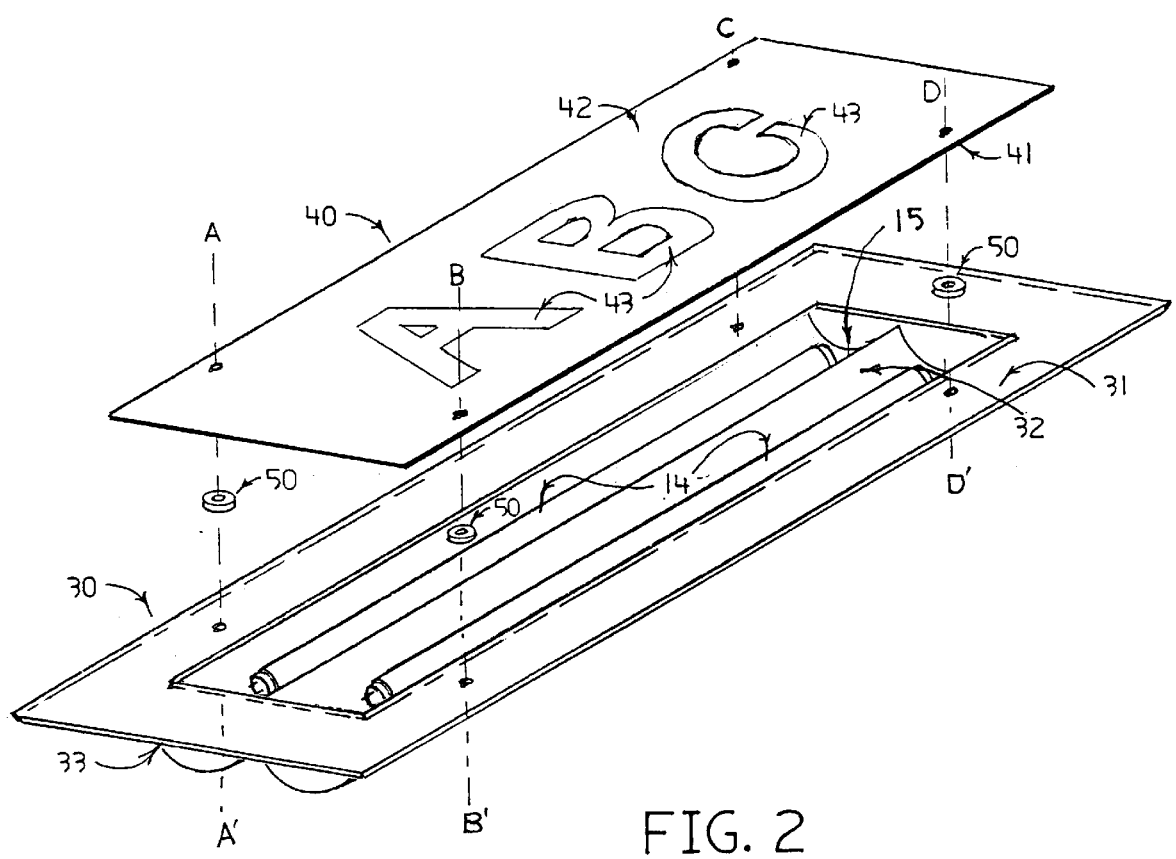
FIG. 2 is a isometric perspective view of partially assembled illuminated sign.
Figure 6:
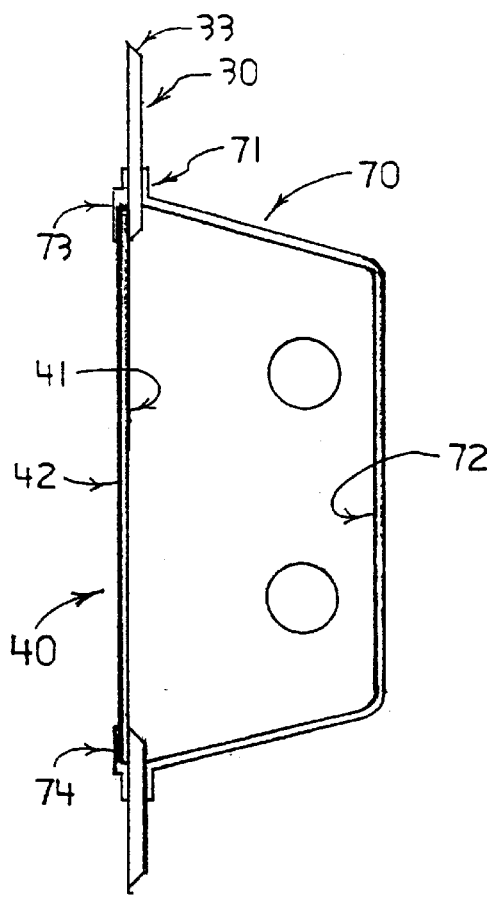
FIG. 6 is a sectional view of assembled illuminated sign with a conventional light box housing and clear plastic panel.

When said back cover (20) with all the components is fastened to the housing (10), it's perspective view will become a looking as shown in FIG. 2, and the way of fastening may be a permanent gluing or mechanical fastening to hold two pieces tight each other. In the fastening of said sign face (40) and fixture housing (10), 4 pieces of spacers (50) are provided to provide opening gaps between said sign face (40) and fixture housing (10) for a better ventilation to dissipate the heat generated by said tubular light source (14). The sign face may also be inserted through it's sliding guide (73) (74) as shown in FIG. 6. when a replacement of the sign face is required.

Figure 3:
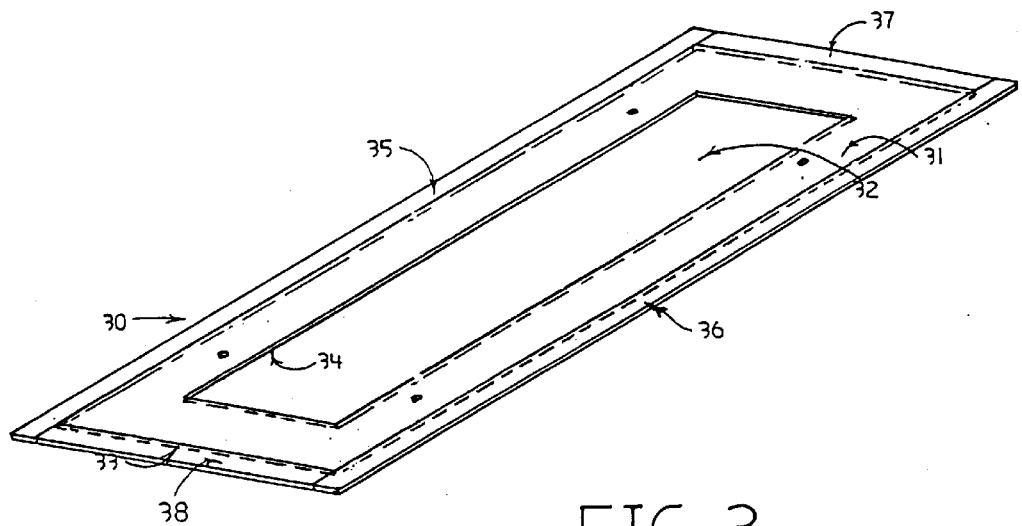
FIG. 3 is a isometric perspective view of one example of clear plastic panel extended by four pieces of clear color plastic pieces.

FIG. 3 shows that 4 pieces of extended transparent color plastic pieces (35), (36), (37) and (38) are attached along the edge of clear plastic frame (31) to add more visual effect as an illuminated sign. The connecting cut face (33) for extension may be a bevel cut or regular square cut chosen at a convenience in production which would not make much different in the passing of the light energy across the joint surface. The light energy that arrived the edge line (33) will further proceed toward outside of panel frame (31) in all different direction in to the air unless the panel frame is not extended. But, free end of the clear panel is extended by clear color plastics pieces (35), (36), (37) and (38), a part of light energy dispersed on the edge (33) will further proceed into the extended pieces by the same light piping mechanism which is a consecutive total reflections explained earlier. Specially, if these extended pieces are transparent or transluscent fluorescent color plastic material, the fluorescent pigment will be excited by ultra violet ray, and the fluorescent color pigment will emit a stronger and colorful illumination therefrom, and it will add a colorful illuminated edge lines on the top of a general effect of the illuminated sign. If the color of attached fluorescent pieces are different from the color emitted by the light source (14), the sign will be glow in more than one color as a whole illuminated sign.

Figure 4:
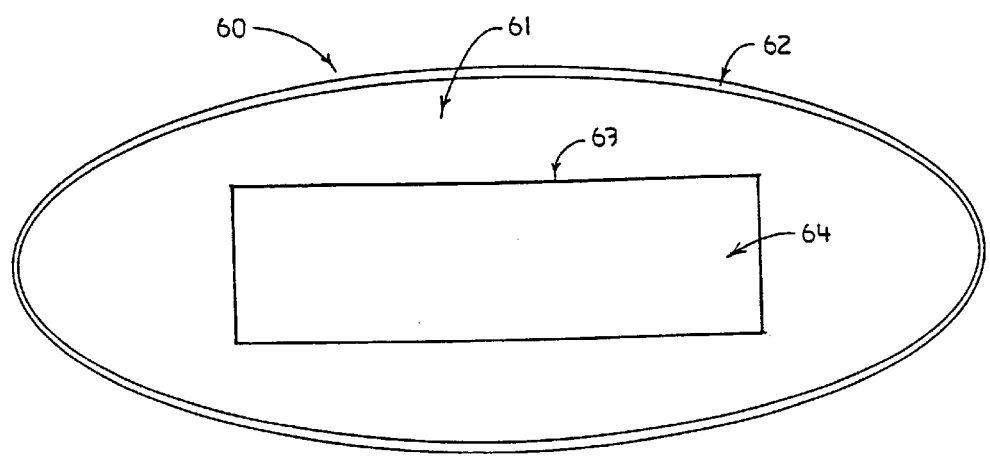
FIG. 4 is a front view of another example of shape of the clear plastic panel.

Virtually, there are no limitations in the color or length or even shape of said clear plastic panel (31) as well as the extended pieces which is a outstanding advantages of this invention as an improved illuminated sign. It can be any irregular shape or any geometrical shape of free end line of the panel, and one of the examples is shown in FIG. 4. The opening area (64) will be identical to said opening area (32) and the free end cut line (63) should be the same bevel cutting as said cut face (34), and free end edge line (62) is also the same bevel cutting as the outer bevel cut face (33). This oval shape shown in FIG. 4 can be any irregular shape such as outline of animal or any letters etc. which can be a part of message or impressional image or even a logo of trade mark or trade name of products. Furthermore, if any graphics are provided on the back surface of said panel frame (61) by using cut vinyl or paint, it will glow in the same color that emitted by the light source because the light energy arrived at the graphics will proceed beyond the panel surface and penetrating in to the particles of the material of art work when there is no air molecules left in between the panel surface and art work material. And, the light energy will be dispersed on the graphics which will glow as an illuminated graphics. In further, the front face of the panel may be used as an illuminated writing board when a water base wet erasable fluorescent markers are used for writing or drawing which will be illustrated in detail later.

Figure 5:
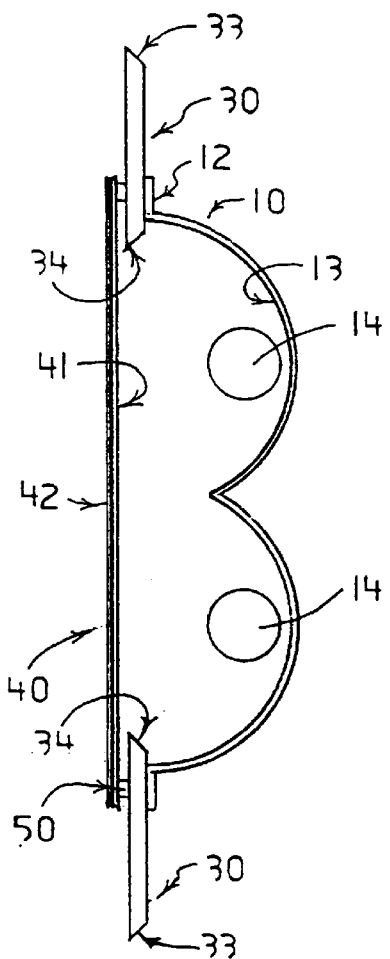
FIG. 5 is a sectional view of assembled illuminated sign illustrated in FIG. 1 and FIG. 2.

FIG. 5 is showing an typical example of cross sectional view of assembled illuminated sign that is a improved version of the invention described in the U.S. Pat. No. 5,509,223 Lighting System while FIG. 6 is showing a another example of improvement that the housing for the light source is replaced by a conventional light box. The inside wall of both (13) and (72) should be bright enough and strong enough to reflect maximum incident light energy. To realize these requirement, a silver or aluminum deposited film may be lined on the inside surface.

Figure 7:
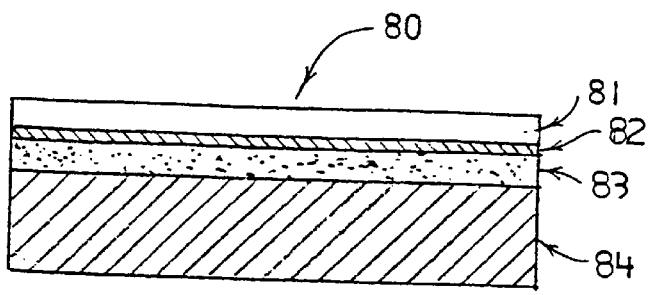
FIG. 7 is a exploded sectional view of improved laminated sheet material for illuminated sign housings.

A new combination of highly reflective film (81) in the thickness of 0.5 mil (5/10,000") to 1 mil (1/1,000") polymeric plastic film with a layer (82) of aluminum or silver deposited on one surface of the film (81) laminated on a thermoformable polymeric plastic sheet (84) for a thermoforming is shown in FIG. 7. The surface layer (81) is a base film layer which is carrying the vacuum deposited silver or aluminum layer (82), and a thermosetting adhesive layer (83) is provided on the reflective silver or aluminum layer (82) surface for thermo press lamination.

The most popular material of said base film (81) is normally polyester, poly-propylene, poly-styrene or acrylic film, and the most popular material of said vacuumformable plastic sheet (84) material is ABS, poly-propylene, poly-styrene, PVC and poly-carbonate, or it's mixed compound. All of these film and sheet material have all different physical characteristics in the heating, and softening temperature of each material is all different which yields many difficulties to perform a good thermoforming with film laminated plastic sheets. In particular, when the most popular 2 mil polyester film is laminated on 0.125" ABS sheet, a stretchability of both material at same temperature is not close enough to have a good thermoforming even a differentiated heating technologies are applied. But, when any of above mentioned material film in the thickness of 0.5/1,000"–12/1,000" with aluminum or silver deposited surface laminated on 100/1,000"–150/1,000" thick thermoformable plastics are manageable by differentiated heating from both face regardless the kind of the kind of thermosetting adhesive layer (83). Some combination of materials of the film and the base sheet can be managed even with one side heating method of the laminated stock (80). Specularity is sometimes diminished in some combination of the film and the base panel sheet as the material is heated, but it is still good enough to be used as said housing of the illuminated sign by using vacuum forming or thermo press forming technology, and it can save substantial amount of labor and time in the production of various illuminated sign housings.

The application as a wet erasable writing board is shown in FIG. 8-A, 8-B, 8-C and 8-D. Back board (82) is an extended flange of the housing (86), and the rest parts are the same to the plastic illuminated sign housing illustrated in FIG. 1. FIG. 2, FIG. 5 and FIG. 6. The end portion of the back face is bent to provide a support for a better stabilization in the mounting of the sign on any flat surfaces.

The one end (88) of the clear plastic sheet (83) is bent at certain degree to receive a maximum amount of light energy emitted from the light source (87) as shown in FIG. 8-B and 8-D, and the end of the bent portion should be close enough to take as much light energy as possible through the edge of bent portion (88). But, an enough space should be provided for a front access of replacement of the tubular light source (87). If a side access for a replacement of the light source is provided by a design, the edge of the bent portion (88) should be able to extend the length of the bent portion to get very close to the lighting emitting surface of said tubular light source (87). The light energy started traveling in said clear plastic panel board (83) entered through the edge face will proceed the travelling all the way up to the free end edge of the clear plastic board (83") where the light energy will be dispersed as illustrated previously in this specifications. When the edge lines are bevelled, dispersed light will create an illuminated line all along the free end boarder lines (83") around the board. If a black background color is backing the illumination, the visibility of the illumination on the free end edge will be visually enhanced remarkably.

At the same time, the front surface of said clear plastic panel (83) may be used as an wet erasable writing surface by using water base fluorescent markers. The fluorescent color pigment will glow due to a stimulation of short wavelength electromagnetic wave energy emitted by the light source (87), normally called as ultra violet ray. Even the ink is not a fluorescent ink, it will still glow in lower intensity of brightness than fluorescent markers. When these marker are water base inks, it may be easily removed by moisturized paper or rag. To prevent any possible scratches on the writing surface of the clear plastic panel (83), it is preferable to use a special kind of surface treated panel having a silicon layer coated on the writing surface (83') of the clear plastic panel (83).

FIG. 8-A and FIG. 8-C are showing front view of basic examples of improved applications, and in more specific, a difference of two example shown in the figures are location of the sign face (84) secured by holding member (85) and number of said clear plastic panel (83), and this can be diversified in many different way of design based on the same concept in the designing in manufacturing.

What is claimed is:

1. An edge-lit light box sign assembly comprising;
    a plastic housing having at least one semi-circular linear concave surface having a depth, a highly reflective plastic film lined thereon, a flange extending in all directions to provide an enlarged area, and an extended clear plastic panel seated on said flange for use as a writing board, said flange having at least one end thereof being bent in a right angle towards the back thereof to define a bent section, said bent section having the same length as the depth of said linear semicircular concave section to provide a supporting leg for stable mounting of said edge-lit light box sign on any plane surface; and
    said clear plastic panel has a surface area slightly smaller than the surface area of said enlarged area of said extended flange, whereon any message or artistic graphics may be drawn by using wet erasable water base fluorescent markers, said clear plastic panel having at least one end portion being bent along a predetermined line parallel to a free edge straight line of said panel at a predetermined angle so that the edge line of the bent portion is facing towards the center of a light source positioned within the concave section, and a maximum light energy may enter into a edge face of the bent portion of said clear plastic panel, being seated on said extended flange area by fastening means;
    a sign face plastic panel having graphic art provided on the surface thereof and being held and slidingly movable on holding means, and said sign face plastic panel covers an opening area defined by said clear plastic panel which allow one of direct and diffusive passing of light energy emitted from said light source to observers therethrough; and
    said light source comprising at least one tubular lighting means positionally located adjacent to a bottom of said highly reflective semicircular concave surface for each one of said semicircular concave surface for each one of said semicircular and linear reflective surface.

2. An edge-lit light box sign assembly claimed in claim 1 wherein; only one side of longer piece of said flange is extended to provide said writing area.

3. An edge-lit light box sign assembly claimed in claim 1 wherein; two side of longer piece of said flanges are extended to provide two of said writing area.

\* \* \* \* \*